United States Patent [19]

Coors

[11] 4,306,208
[45] Dec. 15, 1981

[54] JOY-STICK CONTROLLER
[75] Inventor: George T. Coors, Tipp City, Ohio
[73] Assignee: Ledex, Inc., Vandalia, Ohio
[21] Appl. No.: 110,969
[22] Filed: Jan. 10, 1980

Related U.S. Application Data

[63] Continuation of Ser. No. 910,425, May 30, 1978, abandoned.
[51] Int. Cl.³ .............................. H01F 21/02
[52] U.S. Cl. ................... 336/30; 336/136; 338/128; 200/153 LA
[58] Field of Search ............ 137/85; 310/27; 318/676; 323/64; 200/339, 153 L, 153 LA, 153 G, 153 LB; 338/128; 361/283, 287–292; 336/30, 136; 74/25, 27, 495–497, 459

[56] References Cited

U.S. PATENT DOCUMENTS

| | | | |
|---|---|---|---|
| 2,408,770 | 10/1946 | Frische et al. | |
| 2,842,147 | 7/1958 | Markson | 336/136 |
| 2,895,086 | 7/1959 | Pettit | 336/30 |
| 2,903,663 | 9/1959 | Collina | 336/134 |
| 3,047,682 | 7/1962 | Hults | 200/153 LA |
| 3,434,342 | 3/1969 | Kazmarek | 336/30 |

OTHER PUBLICATIONS

Universal Operator, OEM Controls, Inc., Norwalk, Conn., 9/10/75.
Potentiometers, Kraft Systems, Inc., Vista, California, 8/22/75.

*Primary Examiner*—Gerald P. Tolin
*Attorney, Agent, or Firm*—Biebel, French & Nauman

[57] ABSTRACT

Mechanical lever controllers, also known as joy-stick type actuators, include a body within which is mounted a rod or lever for pivotal movement. The position of the rod is transmitted by an intermediate coupling or follower member to a differential transformer of the linear voltage differential transducer type (LVDT). The transducer includes an input coil and a pair of oppositely-positioned, axially-aligned output coils, and an armature moves within an armature cavity to vary the inductive coupling between the primary coil and the secondary coils. In one embodiment, two such differential transformers are offset at 90° from each other to provide signals on the "X" and "Y" axes. In another embodiment, single axis output is measured in an actuator having a stackable housing.

10 Claims, 13 Drawing Figures

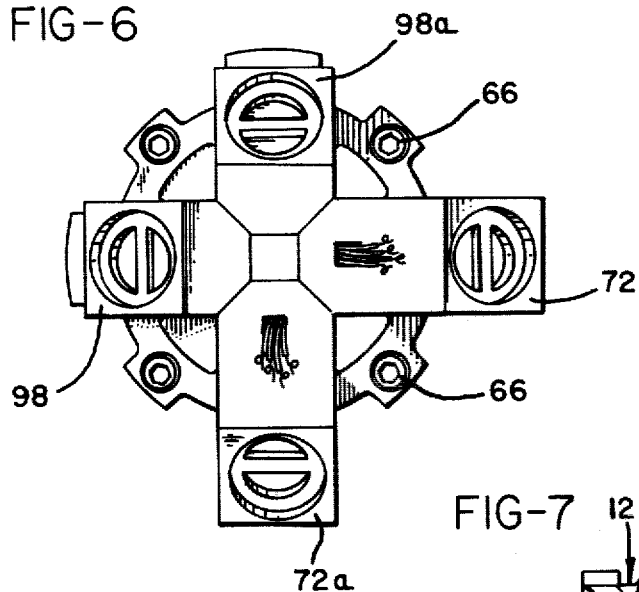
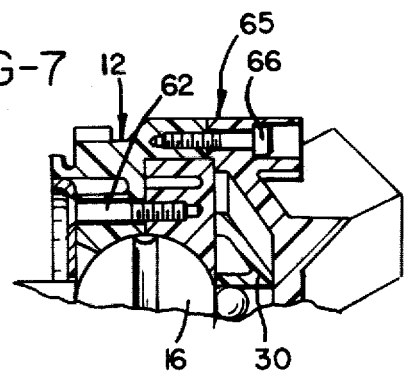
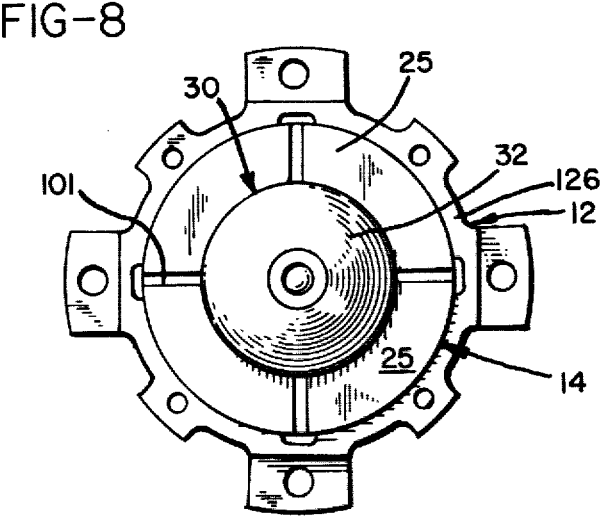

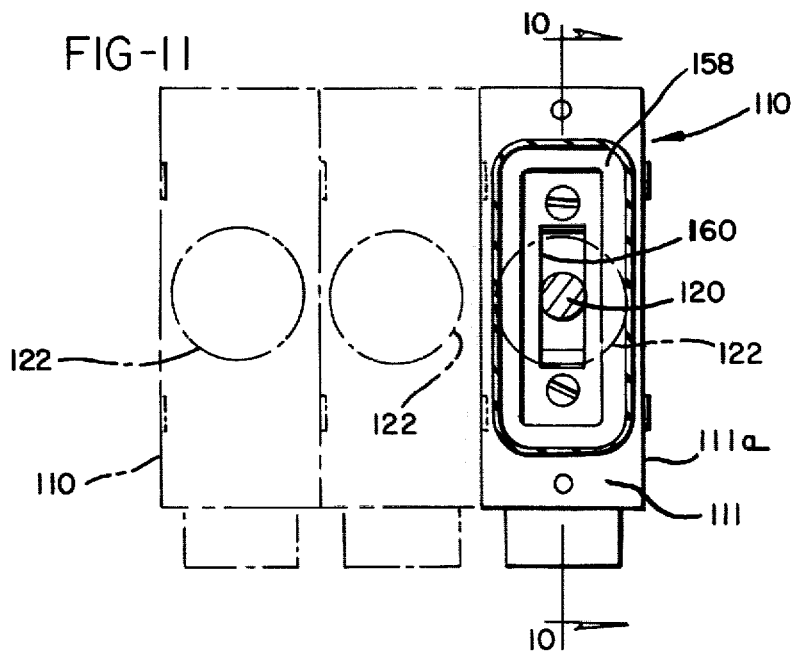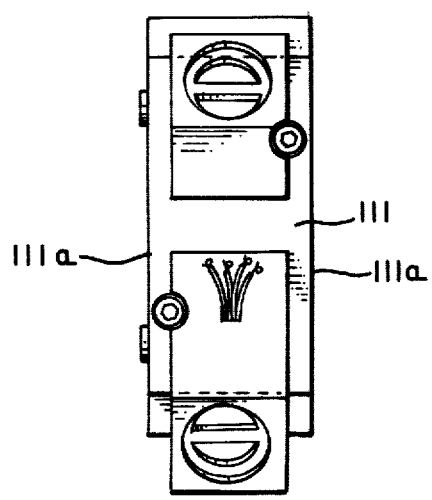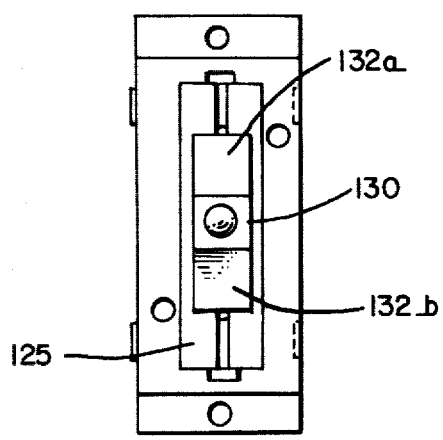

JOY-STICK CONTROLLER

RELATED APPLICATION

This application is a continuation of application Ser. No. 910,425 filed May 30, 1978, now abandoned.

BACKGROUND OF THE INVENTION

In the field, mechanical actuating and lever controllers, often referred to as joy-stick actuators, there is a need for a reliable, low-cost position responsive controller which provides an electric signal in accordance with the displacement of a lever from a neutral position. It is also desirable to provide an inexpensive long-life controller which may be used in hostile environments such as in the presence of corrosive gases, high humidity, or even directly exposed to contact by liquids.

Commonly, such units employ variable resistors or potentiometers which are coupled to the manually operable lever through pivots, pinion gears, or the like. The outputs of control units accordingly employ moving or wiping contacts which are subject to wear, corrosion and resulting erratic operation and failure.

SUMMARY OF THE INVENTION

This invention is directed to an improved low cost, mechanical lever controller, otherwise known as a joy-stick actuator, in which the movement of a manually operable lever either side of a manual or neutral lever position, is detected by a transducer of the LVDT type, comprising a differential transformer or a linear voltage differential transducer. The important advantage of the actuator of the present invention resides in the fact that no sliding or wiping electrical contacts are employed. Rather, the position of an armature is detected in a sealed unit which is impervious to environmental conditions.

Two embodiments of the actuator are shown. One is adapted for providing signals along "X" and "Y" axes and employs two transducers at 90° relation to each other. The other embodiment employs a single transducer and is adapted to provide a signal responsive to lever movement in one axis only. The single transducer embodiment is in a compact form with flat sides suitable for stacking.

In the first embodiment, suitable gates may be provided by means of which the path of movement of the lever may be controlled, such as by providing for unrestricted or 360° movement, movement along intersecting "X" and "Y" axes only, or movement along a single axis.

The controller further provides a mechanical structure by means of which the position of a manually operable lever is transferred to the armature of a differential transducer. To this end, the handle is preferably attached to a pivot ball and the pivot ball in turn is coupled to a sliding actuator or follower which moves along a planar surface. The differential transformer is mounted in the housing at an oblique angle to the planar surface and includes a plunger or follower which coacts with an outer sloping surface, which may be a conical surface formed on the follower, so that the position of the plunger is changed in accordance with sliding movement of the follower on the planar surface. The plunger is in turn coupled to the armature and is spring biased against the follower. An additional spring loaded plunger may be positioned in the body diametrically opposite the functional plunger and spring biased against the follower for the purpose of balancing the loading on the follower.

It is accordingly an important object of the invention to provide a joy-stick actuator in which the extent of displacement of a rod or lever either side of neutral center position is sensed by a differential transformer, in which two or more coils are positioned on a common armature cavity, and in which an armature is movable in the cavity so that the displacement of the armature from a neutral position provides a corresponding electrical signal in at least one of the coils.

Another object of the invention is the provision of an actuator as outlined above in which the position of a movable lever is transmitted to one or more linear voltage differential transducers which employ a center coil and a pair of axially aligned, oppositely disposed, secondary coils and a common axially movable armature, in which the armature is coupled for movement in accordance with the position of a control lever. Two such transformer arrangements may be positioned effectively at right angles to each other to provide indications of lever movement in the "X" and "Y" axes.

These and other objects and advantages of the invention will be apparent from the following description, the accompanying drawings and the appended claims.

BRIEF DESCRIPTION OF THE DRAWINGS

FIG. 6 is a rear elevational view of the actuator of FIG. 1;

FIG. 7 is a fragmentary section taken generally along the line 7—7 of FIG. 4 showing the manner in which the several housing parts are interconnected;

FIG. 8 is an elevational view of the interior of the actuator with the transducer housing removed showing the follower member of the bottom of the inner housing;

FIG. 11 is a top view thereof with the handle ball removed for clarity and showing in phantom additional units in stacked relation;

FIG. 12 is a bottom view of the actuator of FIG. 9; and

FIG. 13 is an inside view similar to FIG. 8 with the bottom housing removed showing the follower and the inner housing members in elevation.

DESCRIPTION OF PREFERRED EMBODIMENTS

Figure 1:
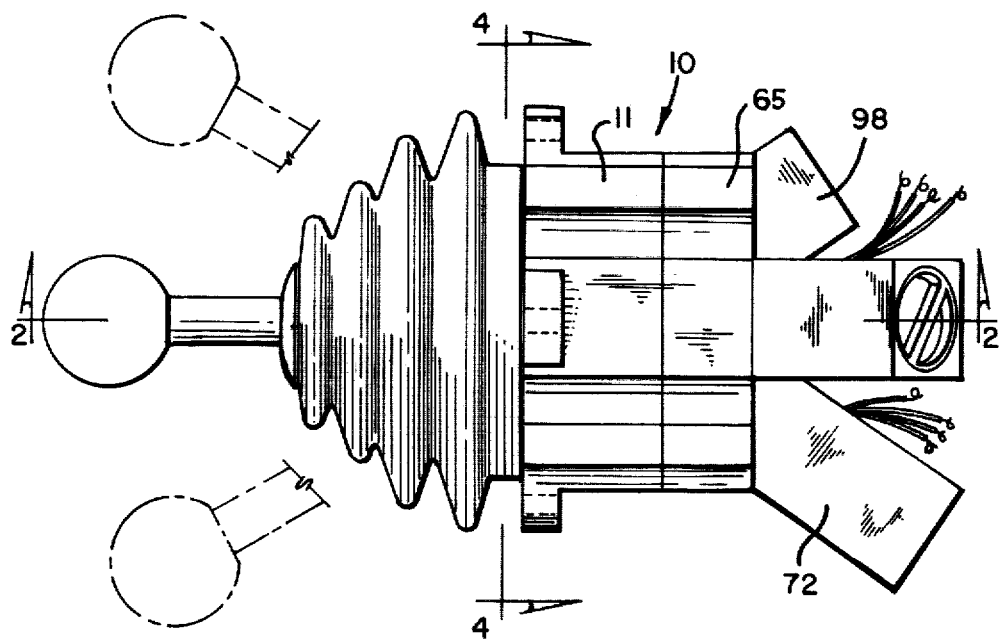
FIG. 1 is an elevational side view of an actuator in accordance with this invention.
Figure 2:
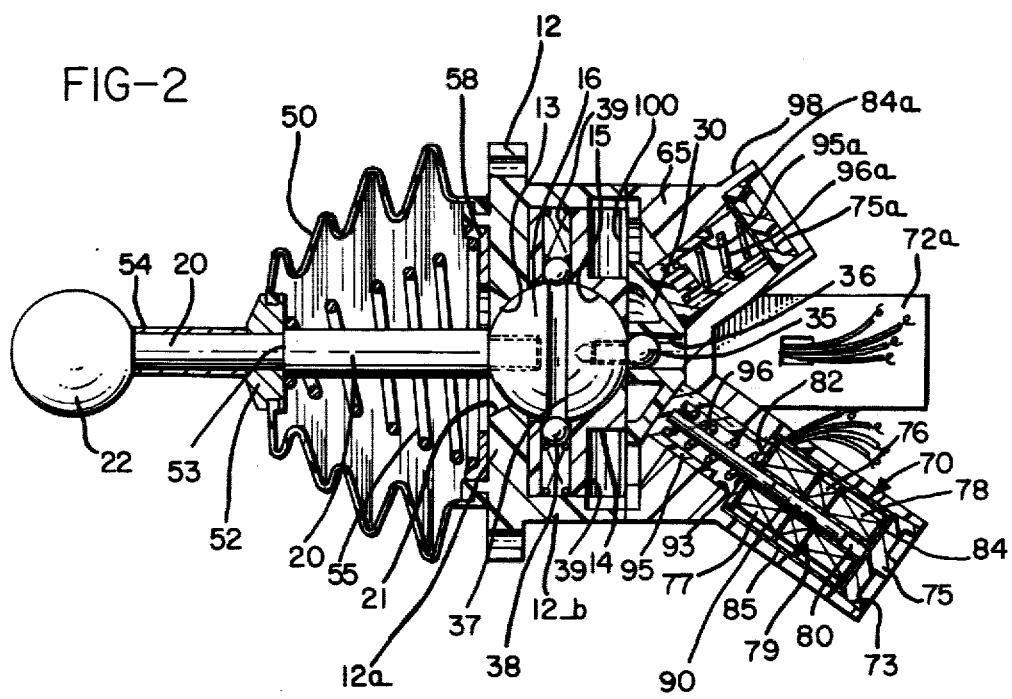
FIG. 2 is a longitudinal section taken generally along the line 2—2 of FIG. 1.

A joy-stick mechanical lever controller or actuator is illustrated generally at 10 in FIGS. 1 and 2 as having a two-piece body 11. The body 11 is preferably molded of plastic material and includes an outer ball housing or retainer 12, which is somewhat cup-shaped with a front wall 12a and an annular side wall 12b. The front wall 12a defines a semi-spherical, inwardly-opening socket 13. The body 11 also includes an inner ball retainer housing 14 received within the side wall 12b of the outer retainer 12 and secured thereto. The housing 14 defines complementary, outwardly-facing, semi-spherical socket 15.

A pivot ball 16 is proportioned to be received in the respective socket portions 13 and 15 and is provided with a handle or actuator rod or lever 20 extending therefrom, through a tapered opening 21 formed in the front wall 12a of the housing 12. The handle 20 may be terminated in a suitable grip 22. The handle or rod 20 is thus mounted on the body 11 for pivotal movement between a central or neutral position, as shown in full lines in FIG. 1, and displaced positions either side of the neutral position, as diagrammatically illustrated by the broken lines in FIG. 1. Also, one fully displaced position is illustrated in full lines in FIG. 3.

The inner ball retainer housing 14 is formed with a generally planar back surface 25 on a side thereof remote from the socket portion 15. A portion of this planar surface is illustrated in elevation in FIG. 8.

An acuator or follower member 30, which may also be molded of plastic material, is shown in elevation in FIG. 8, and in section in FIG. 2. It is positioned on the surface 25. In the embodiment of FIG. 2, the rear or cam surface 32 of the member 30 is generally conical in shape while the front surface thereof is planar and seats flat against the adjacent surface 25.

Figure 3:
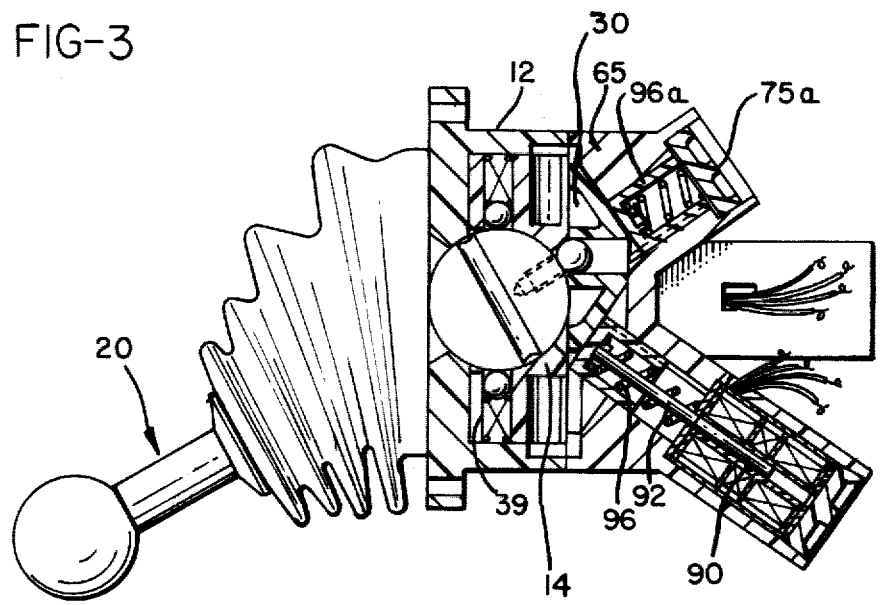
FIG. 3 is a partial sectional view showing the actuator of FIG. 2 in one moved position.

Means for coupling the movement of the handle 20 to the follower member 30 includes a small connector ball 35 which extends through a central opening formed in the inner ball retainer housing 14 and extends into a central or axial cylindrical opening 36 formed in the follower member 30, so that turning movement in the pivot ball 16 within the body 11 causes transverse displacement of the follower member 30 along the surface 25, substantially as illustrated in FIG. 3.

The pivot ball 16 optionally may be provided with detent means by which a center or neutral position is defined and for this purpose the ball 16 may be provided with an annular groove 37. Four spring-biased detent balls 38 may be received through suitable radial openings 39 formed in the inner housing member 14, to detent into the groove 37 in the neutral position of the handle 20. Two of the openings 39 and balls 38 are shown in FIG. 2, and the other two, not shown, are located at 90° relation to those shown.

Figure 4:
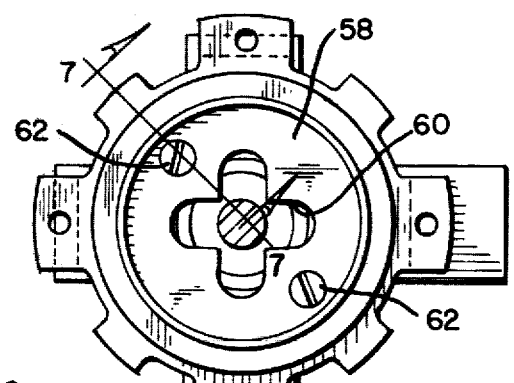
FIG. 4 is a transverse sectional view taken generally along the line 4—4 of FIG. 1 with the boot and coil spring removed for clarity, and showing one form of gate.
Figure 5:
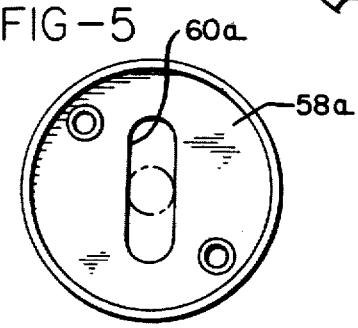
FIG. 5 is an elevational view of another form of the gate which may be used with the actuator of this invention.

An elastomeric bellows-shaped sealing boot 50 may be received in surrounding relation to the handle 20 with a forward end received within a suitable annular groove on a boot-retaining collar 52. The collar 52 is mounted on the handle 20 between a shoulder 53 and a tubular spacer 54, and the inner end of the boot 50 is received within a suitable annular groove formed on the outer housing 12. In order further to assist in returning the handle 20 to the neutral position, a tapered coil spring 55 may be positioned in surrounding relation to the handle 20 with one end bearing against the retainer 52 and the other end bearing against a shallow cup-shaped gate plate 58. The rod 20 passes through an aperture in the gate plate 58, and one embodiment or form of the plate is illustrated in FIG. 4 as having means therein defining a cruciform-shaped slot 60, permitting movement of the handle 20 along intersecting "X" and "Y" axes. The plate 58 may be also provided with a central circular opening, permitting 360° tilting movement of the handle 20. Also, as shown in FIG. 5, a modified plate 58a may be provided with a single slot 60a by which only a single axis of movement is permitted. The plate 58 or 58a is retained to the outer ball housing 11 by means of a pair of flat head screws 62 as shown in FIG. 4. The screws 62 extend through the outer housing 12 and into the inner ball retaining housing 14 to retain these two parts in assembled relation, thereby capturing the pivot ball 16 therebetween, as illustrated in the fragmentary section of FIG. 7.

A transducer housing 65 is supported on the body 11 by means of four cap screws 66 as shown in FIGS. 6 and 7. The transducer housing 65 also is molded of plastic material, includes at least one electric transducer of the differential transformer or LVDT type, as illustrated generally at 70 in FIGS. 2 and 3. The transducer 70 is received within an outwardly angled extended leg 72 of the housing 65. The leg 72 is formed with a first and somewhat larger cylindrical bore 73 therein to receive the transducer 70, and the open end of the bore, and is threaded to receive an end closure plug 75, thereby capturing and retaining the transducer within the leg 72.

The transducer includes a primary coil 76 and a pair of secondary coils 77 and 78 positioned on opposite sides of the primary coil 76. The coils 76, 77 and 78 are received on a suitable plastic bobbin 79. The primary coil 76 and the secondary coils 77 and 78 are in common axial alignment, and thereby define a common axial armature opening 80 therein. Metallic washers 82 and 84 are received at the ends of the coils 77 and 78 and the coils themselves are received within a cylindrical metallic sleeve 85 formed as a close fit within the bore 73. The sleeve 85 and washers 82 and 84 complete the magnetic structure of the transducer stator.

An armature 90 is slidably received within the armature cavity 80, and a non-magentic actuator rod, such as the aluminum rod 92, is secured to one end of the armature 90 in axial alignment therewith. The armature 90 is in axially underlying relation to the primary coil 76 and end portions thereof interact within the secondary coils 77 and 78, the extent of interaction depending upon the position of the armature 90.

The transducer housing 65 is counterbored at 93 to slidably receive a keyed plastic plunger 95 therein, for movement in axial alignment with the transducer 70. The axis of the leg 72 including the transducer opening and the counterbore therein is oblique to the plate defined by the surface 25. The plunger 95 is biased by an internal coil spring 96 surrounding the rod 92 to bear against the outer sloping or conical surface 32 of the follower member 30, so that transverse movement of the follower member 30, as shown in FIG. 3, is accompanied by axial movement of the plunger 95 within the counterbore 93. The connecting rod 92 is secured to the inside of the plunger 95 and thus causes a corresponding movement of the armature 90.

Means for counterbalancing the force of the plunger 95 on the follower 30 includes a dummy plunger arrangement formed in an inclined leg 98 which is diametrically opposite the leg 72, including a second plunger 95a essentially identical to the plunger 95, formed in a bore in the leg 98 and retained by another end closure or plug 75a. A second compression spring 96a identical to the spring 96 bears against the inside surface of a washer 84a and against the inside of the plunger 95a to coact against the conical surface 32 of the follower 30. Thus, follower 30 may be considered as having, in the broader sense, at least a pair of sloping cam surfaces, positioned to coact with the respective plungers 95 and 95a.

In the embodiment of FIGS. 1–8, a second identical leg 72a is provided on the housing 65 in right angled relation to the leg 72, including an identical transducer 70, and provided with an identical counterbalancing plunger arrangement in a leg 98a, by means of which the relative positions of the handle 20 along a 90° axis may be indicated. Thus, one of the transducers 70 may be employed to provide "X" axis information and the other may provide "Y" axis information.

From time to time it may be desirable to provide auxiliary position sensing devices such as miniature switches or the like which are actuated in response to movement of the handle 20 into particular positions. For this purpose, the inner ball retainer housing 14 is provided with a series of generally radially-extending bores or grooves 100 in closely underlying relation to the surface 25 and which are opened radially at the surface 25 at slots 101, as viewed in FIG. 8. The bores 100 and the underlying slots 101 provide spaces within which auxiliary position sensing equipment, such as switches, may be mounted as desired with contacting elements extending through the slots 101 for engagement by the follower 30 to provide a desired indication of the position of the lever 20.

Pivotal movement of the handle 20 and ball 16 is translated to transverse sliding movement of the follower 30 on the surface 25 and a corresponding displacement of the armature 90 from the neutral position shown in FIG. 2. It will be understood to those skilled in the art that the position of the armature 90 in the cavity 80 will vary the coupling between the primary coil 76 and the secondary coils 77 and 78. For example, a low voltage constant magnitude or regulated AC signal may be applied to the primary or center coil 76 and inductively coupled AC signals will appear at the secondary coils 77 and 78. These signals may be rectified and connected in series opposition to provide a net DC voltage which would be zero in the neutral or balanced position of the handle. The polarity and the magnitude of the net signal indicate the direction and extent of handle displacement from the neutral or balanced position.

Figure 9:
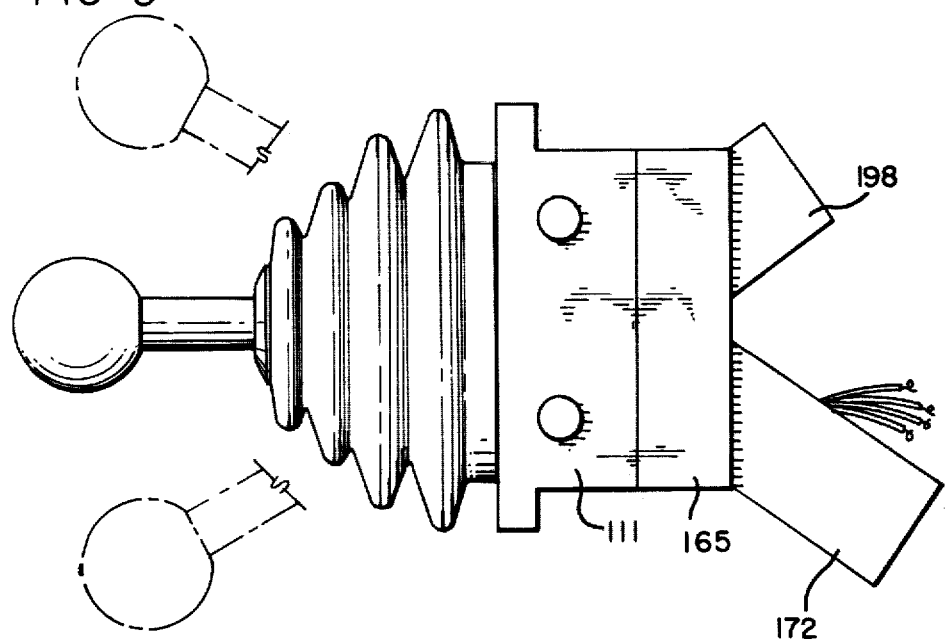
FIG. 9 is a side elevational view of a modified form of the invention adapted for stacking and for single axis control.
Figure 10:
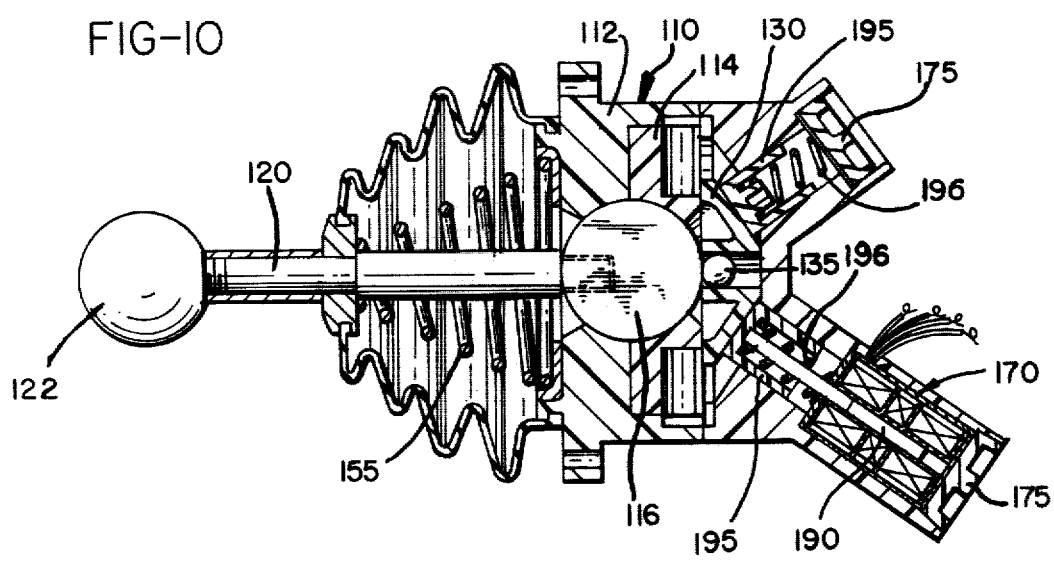
FIG. 10 is a longitudinal section through the embodiment of FIG. 9.

The embodiment shown in FIGS. 9–13 for single axis control is identical in many respects to the preceding embodiment, and in the following description like parts are identified by like reference numerals, plus 100. The body 111 as well as the transducer housing 165 are provided with flat sides 111a by means of which a plurality of the control units 110 may be stacked in side-by-side relation, as shown in FIG. 11. The gate 158 is rectangular in shape and includes only a single elongated slot 160 providing movement of the handle 120 along a single axis. The handle 120 is mounted for pivotal movement on a pivot disc 116, and a modified follower 130 positioned by the ball 135, is formed with a pair of oppositely inclined planar actuator surfaces 132a and 132b as shown in elevation in FIG. 13. The single transducer assembly 170 in this embodiment is substantially identical with the transducer 70 (shown in FIG. 2) including plungers 196 and retaining plugs 175. While the plungers 96 are provided with keys (not shown) which move in ways formed in the respective legs 72 to prevent rotation, the plungers 196 are not keyed and are free to rotate within their respective cavities in the legs 172 and 198 (FIG. 9).

In the single axis embodiment of FIGS. 9–13, a pivot disc 116 is shown as captured in semi-cylindrical cavities between the parts 112 and 114, but it is understood that a cross pin or any other suitable single axis mounting pivot may be provided for the control handle 120 to cause corresponding sliding movement of the follower 130 on the surface 125 with the result that this movement is translated into movement of the transducer armature 190. In the embodiment shown, no detent is provided for the disc 116, but the disc will be returned to its neutral center position by the cooperative action of the compression springs 195 and the coil spring 155.

In the actuators of the invention, the transducer is effectively encapsulated within the transducer housing and may be sealed and made impervious to corrosive gases, moisture and the like. The transducers are free of any electrical sliding contacts and thus are not subject to failure or erratic operation by reason of contact, wear, dirt, or the like.

While the forms of apparatus herein described constitute preferred embodiments of this invention, it is to be understood that the invention is not limited to these precise forms of apparatus, and that changes may be made therein without departing from the scope of the invention.

What is claimed is:

1. A joy-stick actuator, comprising:
 a body,
 an actuator rod,
 means mounting said rod in said body for pivotal movement between a neutral position and a displaced position on either side of said neutral position,
 an actuator follower member in said body having means defining first and second sloping follower-actuating surfaces, angularly disposed to each other,
 means coupling said follower member for movement by said rod,
 a differential transformer including an input coil and a pair of axially aligned output coils positioned on opposite sides of said input coil and defining a common axial armature cavity,
 an armature in said cavity movable between a central neutral position and axially offset positions on either side of said neutral position to vary the inductive coupling between said primary and said secondary coils in accordance with the extent of displacement of said armature from said neutral position, and
 first follower plunger means coacting with said first follower actuating surface and connected to said armature to impart axial movement to said armature corresponding to the extent of pivotal movement of said rod from said neutral position said first plunger means having resilient means such that said first plunger means exerts a force on said actuator follower member at all positions of said actuator follower member; and
 second follower plunger means coacting with said second follower actuating surface and having second resilient means exerting a second force on said actuator follower member to counterbalance said force of said first actuator follower member to maintain said actuator rod at a predetermined position relative to said body.

2. The actuator of claim 1 further including spring means urging said rod to said neutral position.

3. The actuator of claim 1 in which said differential transformer comprises an "X" axis transducer and said actuator further comprises a second differential transformer comprising a "Y" axis transducer positioned in 90° relation to said "X" axis transducer, said second transformer having third plunger means in said body coacting with said follower member.

4. A joy-stick actuator, comprising:
- a ball housing including an outer ball retainer having means therein defining a semi-spherical socket and an inner ball retainer having means therein defining a complementary semi-spherical socket,
- a pivot ball having portions received in said respective sockets,
- means joining said inner and outer retainers together with said pivot ball captured therebetween,
- an actuator handle extending from said ball through said outer retainer,
- said inner retainer having means defining a planar surface on a side thereof remote from said socket,
- an actuator follower member having a generally planar surface on one side thereof positioned against said inner retainer planar surface, means on said ball extending through said inner retainer and coupling with said actuator follower member whereby said actuator follower member is moved along said inner retainer planar surface with tilting movement of said ball,
- said actuator follower member further having means thereon defining a sloping follower-actuating surface,
- a transducer housing supported on said ball housing,
- at least one differential transformer received in said transducer housing, said differential transformer including a primary coil and at least one secondary coil defining a common axial armature cavity and an armature in said cavity selectively movable to vary the coupling between coils, and
- follower plunger means slidably received in said transducer housing connected to said armature and having an exposed surface coacting with said follower member sloping surface for transmitting sliding movement of said follower member to axial movement of said armature.

5. The actuator of claim 4 in which said follower member has means defining a second sloping follower-actuating surface annularly disposed to said first surface, and a second follower plunger means slidably received in said transducer housing coacting against said second surface to counterbalance the force applied to the follower member by the first follower plunger means.

6. A joy-stick actuator, comprising:
- a ball housing including an outer ball retainer having means therein defining a semi-spherical socket and an inner ball retainer having means therein defining a complementary semi-spherical socket,
- a pivot ball having portions received in said respective sockets,
- means joining said inner and outer retainers together with said pivot ball captured therebetween,
- an actuator handle extending from said ball through said outer retainer,
- said inner retainer having means defining a planar surface on a side thereof remote from said socket,
- an actuator follower member having a generally planar surface on one side thereof positioned against said inner retainer planar surface, means on said ball extending through said inner retainer and coupling with said actuator follower member whereby said actuator follower member is moved along said inner retainer planar surface with tilting movement of said ball,
- said actuator follower member further having means thereon defining a sloping follow-actuating surface,
- a transducer housing suppored on said ball housing,
- at least one electrical transducer received in said transducer housing, having a movable element, and
- follower means slidably received in said transducer housing connected to said element and having an exposed surface coacting with said follower member sloping surface for transmitting sliding movement of said follower member to axial movement of said element.

7. The actuator of claim 6 further comprising means in said ball defining an annular groove, and at least one detent received in said ball housing and engageable with said groove to define a predetermined neutral position of said ball.

8. A joy-stick actuator adapted for movement in a single axis comprising:
- a housing including an outer retainer having means therein defining a semi-cylindrical socket and an inner retainer having means therein defining a complementary semi-cylindrical socket,
- a pivot member having portions received in said respective sockets for pivotal movement about said single axis,
- means joining said inner and outer retainers together with said pivot member captured therebetween,
- an actuator handle extending from said pivot member through said outer retainer,
- said inner retainer having means thereon defining a generally planar surface on a side thereof remote from said socket,
- an actuator follower member positioned against said inner retainer surface for movement in translation therealong,
- means on said pivot member extending through said inner retainer and coupling with said follower member, whereby pivotal movement of said pivot member by said handle is translated to translational movement of said follower member along said generally planar surface,
- means on said follower member defining a sloping follower actuating surface, and electrical transducer means in said housing including a cam follower and spring means urging said cam follower into coaction with said actuating surface, said follower being moved by said follower member in response to pivotal movement of said pivot member to provide an electrical output response to movement of said handle.

9. The actuator member of claim 6 in which said follower member has means thereon defining a second oppositely directed sloping follower-actuating surface,
- a second cam follower, and
- second spring means urging said second cam follower against said second surface to counterbalance the force applied to said follower member by the first said cam follower and spring means.

10. The actuator of claim 8 in which said housing has means on an outer surface thereof defining a flat planar mounting surface for receiving the corresponding said mounting surface of an adjacent said actuator, providing for the stacking of a plurality of said actuators in side-by-side relation.

* * * * *